Dec. 31, 1963 R. EMEIS 3,115,694

METHOD OF PRODUCING A SILICON SEMICONDUCTOR DEVICE

Filed March 15, 1961

United States Patent Office 3,115,694

Patented Dec. 31, 1963

3,115,694

METHOD OF PRODUCING A SILICON SEMICONDUCTOR DEVICE

Reimer Emeis, Ebermannstadt, Germany, assignor to Siemens-Schuckertwerke Aktiengesellschaft, Berlin-Siemensstadt, Germany, a corporation of Germany Filed Mar. 15, 1961, Ser. No. 95,884
Claims priority, application Germany Mar. 18, 1960
6 Claims. (Cl. 29—25.3)

Figure 1:
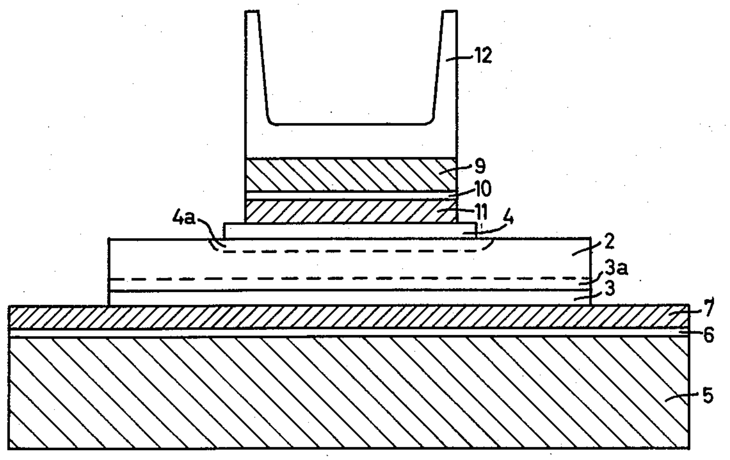

My invention relates to p-n junction rectifiers and other electric semiconductor devices on the basis of silicon.

More specifically, the invention concerns the production of semiconductor devices in which a monocrystalline silicon wafer is alloyed together with a gold or gold-alloy electrode joined face-to-face with a silver coating of a carrier or terminal plate of molybdenum. The silver coating on the molybdenum plate prevents the formation of a molybdenum-silicon compound when the plate is being alloyed together with the gold-containing electrode. Such a compound would impair the adhesion of the gold electrode to the molybdenum plate. The preventive effect of the silver coat is due to the fact that the solubility of silver in the liquid gold-silicon eutectic is only slight, the thickness of the silver coating being such that part of the coating remains preserved during the alloying operation, thus excluding the gold-silicon eutectic alloy from access to the surface of the molybdenum plate proper.

It has been observed, however, that despite the just-mentioned expedient the solder, fushion or alloying bond between the molybdenum plate and the electrode of the silicon wafer is sometimes defective or subject to gradual deterioration.

It is an object of my invention to eleminate such deficiencies.

My invention is based upon the observation that silver, when exposed to air, is capable of binding relatively great quantities of gases, preferably oxygen. The gases are again liberated from the silver when the silver coating of molybdenum plate is subjected to heat treatment, particularly when alloying the molybdenum plate together with the alloy electrode on the silicon wafer. The gases then emerge from the surface of the silver coating at the alloying temperature, and the emerging oxygen can oxodize the surface of the gold-silicon eutectic, thus causing the above-mentioned deficiencies.

According to my invention, relating to the production of a silicon semiconductor device of the type mentioned in which a silicon wafer is alloyed together with a gold-foil electrode, I produce the silver coating of the molybdenum plate separate from the electrode-coated silicon wafer and subject the silver coating, immediately prior to alloying it together with the gold-containing electrode, to a tempering process in vacuum so as to liberate gases from the silver. I have found that in this manner the detrimental gases can be sufficiently removed from the silver coating to prevent oxidation at the surface of the silicon-gold eutectic.

According to another feature of my invention I provide the molybdenum plate, prior to depositing the silver coating, with a nickel coating and with a copper coating on top of the nickel. The nickel coating may have a thickness of approximately 1 micron, for example, and the copper coating a thickness of approximately 5 microns. Both coatings can be deposited galvanically i.e. by electroplating. Thereafter the silver coating can be alloyed onto the plate in a simple manner, preferably in vacuum or under protective gas. This can be done by placing a silver foil, about 50 to 200 microns thick, upon the copper coated flat side of the molybdenum plate and then heating the plate together with the silver foil at a temperature above 770° C., preferably up to 850° C. The copper-silver eutectic occurring at about 770° C. constitutes a very stable compound. The same processing step may serve to temper the silver coating for removing the gases therefrom. For example, when employing an alloying temperature of about 850° C., a heating time of approximately 10 minutes is sufficient for satisfactorily degassing the silver coating.

The finished molybdenum plates are cooled while still under vacuum and, immediately subsequently, are alloyed together with the semiconductor body so that the silver coating, now soldered onto the molybdenum or copper surface, is not excessively long exposed to the atmospheric air and a renewed absorption of appreciable quantities of oxygen is prevented.

If a prolonged storing of the molybdenum plate in air after depositing the silver foil is inevitable, the tempering for removal of absorbed gas can also be carried out by again heating the plates, directly previous to contacting them with the semiconductor body, under vacuum up to nearly the melting point of the solder used for fastening the silver foil, for example at a temperature of about 700° C. to 750° C. By maintaining the temperature substantially constant for a period of about one hour or more, any absorbed gases can be sufficiently eliminated. After cooling the plates in vacuum, they are immediately alloyed together with the alloy electrode of the semiconductor body.

The invention will be further described with reference to the examples of silicon p-n junction rectifiers shown in section and on greatly enlarged scale in FIGS. 1 and 2 of the drawing respectively.

The rectifier according to FIG. 1 comprises a circular silicon wafer 2 of p-type conductance. A boron-containing gold foil is joined with the silicon on the bottom side of the wafer by an alloying process. Due to this process there occurs a gold-silicon alloy layer 3 and a p-type electrode region 3*a* which is highly doped with boron. These regions result from the recrystallization of the silicon as it converts during the cooling from liquid to solid condition. The alloying temperature applicable for the just-mentioned process may be approximately 700 to 800° C.

In the same process, an antimony-containing gold foil is alloyed into the top surface of the silicon disc with the result of producing an antimony-containing gold alloy region 4 and an n-type region 4*a* in the silicon body which is highly doped with antimony.

Separately and independently of the above-described alloying process, the top side of a molybdenum carrier plate 5 of about 3 mm. thickness is provided with a copper coating 6, for example of 5 microns thickness. This is preferably done by electroplating. Deposited upon the copper layer is a silver coating 7. This can be done, for example, by placing a silver foil of about 50 to 200 microns thickness upon the copper-coated molybdenum plate, and then heating both in vacuum to a temperature above the eutectic temperature of the silver-copper eutectic, for example up to about 850° C. For the purposes of the invention, this temperature is preferably kept constant for at least about 10 minutes. Thereafter the molybdenum plate is permitted to cool in vacuum. Immediately thereafter the silver coating of the plate is alloyed together with the alloy-electrode layer 3 of the silicon wafer 2 at a temperature of about 400 to about 500° C.

The rectifier further comprises a terminal plate 9 of molybdenum, which, in the same manner as the carrier plate 5, is provided on one side with a copper layer 10 and with a silver coating 11 tempered to eliminate gas absorptions. This prepared plate 9 is alloyed together with the gold-silicon layer 4 on the top side of the silicon wafer. This is done simultaneously with the above-described alloying of the plate 5. The molybdenum plate 9 has its top surface joined by hard soldering or brazing with a copper cup 12 into which the end of a current-supply cable can be fastened, for example by pressing it into the cup.

It has been found that the degassing of the silver coating can be improved by maintaining the molybdenum plate with the silver coating on the above-mentioned elevated temperature for a period of more than one hour.

Figure 2:
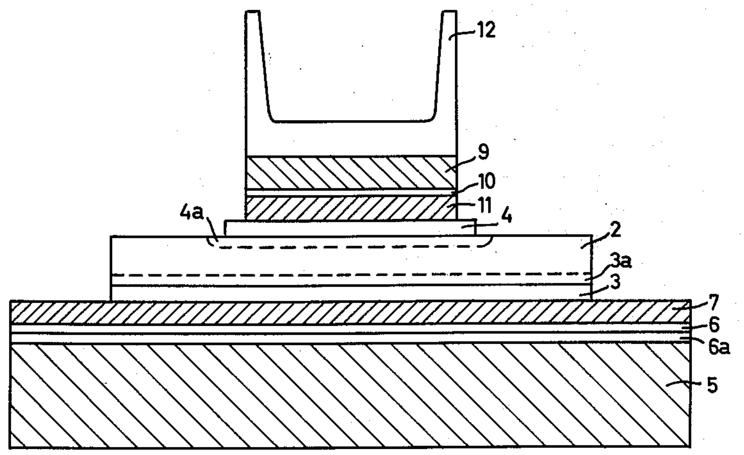

The rectifier shown in FIG. 2 is essentially similar to that described above with reference to FIG. 1 but is improved with respect to the following feature. Inserted between the molybdenum plate 5 and the copper layer 6 is an additional nickel layer 6*a* which forms an alloy with the molybdenum of the carrier plate 5 and thereby improves the adhesion of the copper layer 6. The nickel layer and copper layer are preferably deposited successively upon the carrier plate by electroplating.

I claim:

1. The method of producing an electric semiconductor device having a monocrystalline silicon wafer with a gold-foil electrode alloy-bonded to the wafer and a molybdenum plate with a silver coating adjacent to the electrode, which comprises the steps of providing the molybdenum plate with the silver coating separate from the silicon wafer, tempering the silver coating on the plate in vacuum at a temperature, below the melting point of silver, sufficiently high that the silver coating glows, to liberate gasses from the silver coating, and immediately thereafter alloying, at a temperature between about 400° and 500° C., the gas-free silver coating together with the gold-foil electrode of the silicon wafer.

2. The method according to claim 1, wherein the tempering of the silver coating is effected at a temperature in the range of about 700° C. to 850° C.

3. The method of producing an electric semiconductor device having a monocrystalline silicon wafer with a gold-foil electrode alloy-bonded to the wafer and a molybdenum plate with a silver coating adjacent to the electrode, which comprises the steps of providing the molybdenum plate with the silver coating separate from the silicon wafer, tempering the silver coating on the plate in vacuum at a temperature in the range from about 770° C. to 850° C., and maintaining said tempering temperature constant for at least about 10 minutes whereby gases are liberated from the silver coating, and immediately thereafter alloying, at a temperature between about 400° and 500° C., the gas-free silver coating together with the gold-foil electrode of the silicon wafer.

4. The method of producing an electric semiconductor device having a monocrystalline silicon wafer with a gold-foil electrode alloy-bonded to the wafer and a molybdenum plate with a silver coating adjacent to the electrode, which comprises the steps of providing the molybdenum plate with the silver coating separate from the silicon wafer, tempering the silver coating on the plate in vacuum to liberate gases from the coating, thereafter reheating the coated plate to a temperature between about 700° C. to about 770° C. and maintaining the temperature constant for a minimum period of about 1 hour, and immediately thereafter alloying, at a temperature between about 400° and 500° C., the silver coating together with the gold electrode of the wafer.

5. The method of producing an electric semiconductor device having a monocrystalline silicon wafer with a gold-foil electrode alloy-bonded to the wafer and a molybdenum plate with a silver coating adjacent to the electrode, which comprises the steps of providing the molybdenum plate first with a nickel coating and then with a silver coating on top of the nickel, tempering the coated plate in vacuum at a temperature, below the melting point of silver, sufficiently high that the silver coating glows, to liberate gasses from the silver coating, and immediately thereafter alloying the gas-free silver coating together with the gold-foil electrode of the silicon wafer at a temperature about 400° and 500° C.

6. The method according to claim 5 wherein the nickel coating and thereafter the silver coating are electroplated onto the molybdenum plate.

References Cited in the file of this patent

UNITED STATES PATENTS

| | | |
|---|---|---|
| 2,763,822 | Fiola et al. | Sept. 18, 1956 |
| 2,929,751 | Blakelock | Mar. 22, 1960 |
| 2,945,285 | Jacobs | July 19, 1960 |
| 3,031,747 | Green | May 1, 1962 |
| 3,052,572 | Hase | Sept. 4, 1962 |